United States Patent [19]
Moran

[11] 3,940,821
[45] Mar. 2, 1976

[54] CAR DRYER

[76] Inventor: Fred R. Moran, 1191 Calle Contento, Thousand Oaks, Calif. 91360

[22] Filed: Oct. 25, 1974

[21] Appl. No.: 517,913

[52] U.S. Cl. .............................. 15/97 B; 15/DIG. 2
[51] Int. Cl.² ........................................... B60S 3/04
[58] Field of Search...... 15/97 R, 302, DIG. 2, 53 R

[56] References Cited
UNITED STATES PATENTS

| | | | |
|---|---|---|---|
| 1,636,082 | 7/1927 | Stevens et al. | 15/97 R |
| 3,504,394 | 4/1970 | Weigele et al. | 15/97 R X |
| 3,774,259 | 11/1973 | Genaro | 15/97 R |

FOREIGN PATENTS OR APPLICATIONS

| | | | |
|---|---|---|---|
| 681,464 | 1/1965 | Italy | 15/DIG. 2 |

Primary Examiner—Edward L. Roberts
Attorney, Agent, or Firm—Ralph B. Pastoriza

[57] ABSTRACT

A cylindrical drum is rotatably mounted to a frame above the path of a car in an automatic car wash system. A plurality of towels are connected to the peripheral surface of the drum at spaced circumferential points to depend downwardly from the drum. A car passing under the drum is thereby successively wiped by the towels. Rotation of the drum positions successive towels for wiping action. A heater is positioned adjacent the upper portion of the drum for warming and drying the towels passing under the heater as a consequence of rotation of the drum.

8 Claims, 4 Drawing Figures

CAR DRYER

This invention relates generally to automatic car wash systems and more particularly to an improved car dryer arrangement for use in such systems.

BACKGROUND OF THE INVENTION

Conventional automatic car wash systems in use at the present time normally provide large blowers for drying vehicles as they exit from the car washing apparatus. While the blowing of large quantities of air over the vehicle is effective to some extent, it is usually required to hand wipe the vehicles to effect a complete drying and remove any "spotting." In addition, the provision of the blowers themselves is expensive and a substantial horsepower is required to operate the same.

In an effort to overcome some of the foregoing problems, it has been proposed to introduce mechanical type wiping arrangements which would replace, to a large extent, the necessity for hand wiping of the vehicle after it passes through the car wash and further would reduce substantially the amount of power or energy required for any blowers that might be used.

U.S. Pat. No. 3,504,394 illustrates one such apparatus for the drying of vehicles. In the particular structure shown in the patent, there are provided a pair of endless loop chains positioned above the path of travel of a vehicle to which transverse rods are attached. Suitable cloth material or moisture-absorbing towels are hung from the transverse rods so that as the endless chain loops move, the towels are dragged over the vehicle. While the approach set forth in the foregoing patent is a step in the right direction towards diminishing the total overall power required at a car wash facility, the structure itself is elongated in the path of travel in order to accommodate the necessary number of depending towels to effectively wipe the car dry. In other words, the total path that the car must travel through the entire apparatus is necessarily elongated to accommodate the depending towel structures. Further, should any of the depending towels become snagged on a vehicle, the entire apparatus would normally have to be shut down to free the towel or alternatively, the entire cloth structure depending from the particular transverse rod involved could be badly torn.

BRIEF DESCRIPTION OF THE PRESENT INVENTION

The present invention contemplates an improved car dryer apparatus for performing a function similar to that set forth in the heretofore mentioned patent but in a manner to achieve the same with greater economy. Moreover, the improved apparatus is designed to minimize problems should any snagging of the drying towels or cloths occur.

More particularly, rather than employ an elongated endless chain type structure for rectilinearly transporting transverse rods from which towels depend, the present invention utilizes a large diameter drum supported on a frame means over the path of travel of the car through the car wash system. The axis of the drum extends transversely to the path of the car, the drum having an axial length at least equal to the width of the car. Motor means coupled to the drum rotate it when energized. A plurality of towel means are coupled to the drum and depend from its peripheral surface at circumferentially spaced points. The arrangement is such that a car passing under the drum is successively wiped by the towel means. Rotation of the drum positions successive towel means for wiping action.

Important features of the improved apparatus of this invention include car operated switch means for de-energizing the rotation of the drum while a car is passing thereunder and starting rotation of the drum by the motor means after the car has passed so as to cause successive towels to pass over the top of the cylindrical drum. During this passage, a heating means is provided for drying out the towels.

In addition, the individual towel means depending from peripheral surface portions of the drum include a main rectangular fabric curtain, the drying towels themselves being frictionally retained at overlapping portions at the lower margin of the curtain so that should any one towel become snagged, it will pull free of the curtain and thus avoid interference with the remaining towels.

BRIEF DESCRIPTION OF THE DRAWINGS

A better understanding of the present invention will be had by referring to a preferred embodiment thereof as illustrated in the accompanying drawings in which.

DETAILED DESCRIPTION OF THE PREFERRED EMBODIMENT

Figure 1:
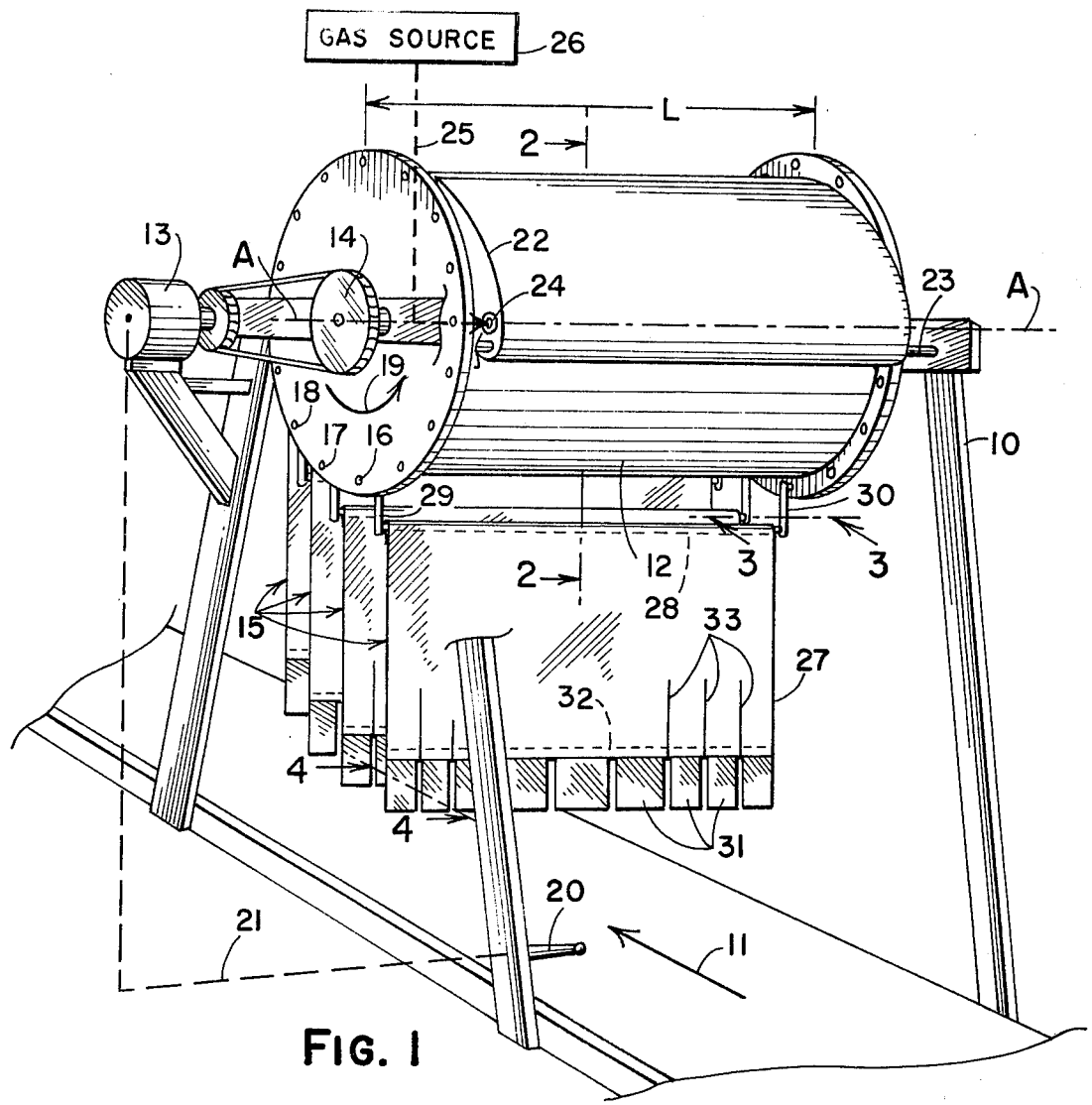
FIG. 1 is a broken away, perspective view of the overall car dryer of the present invention.

Referring to FIG. 1, there is shown a frame means 10 positioned over the path of travel of a car through an automatic car wash system. This path of travel is indicated generally by the arrow 11.

A cylindrical horizontal drum 12 is rotatably mounted to the frame means 10 above the path of travel so that a car passes under the drum. As shown, the axis of the drum indicated at A—A extends transversely to the path of the car and the drum itself has an axial length L at least equal to the width of the car. Typically, the drum may be about four feet in diameter and about eight feet long.

Supported on the frame means 10 and shown in the upper left of FIG. 1 is a motor means 13 coupled to the drum as by gear 14 for rotating the same when energized. A plurality of towel means 15 are coupled to the drum and depend from its peripheral surface at circumferentially spaced points such as indicated at 16, 17, and 18, so that a car passing under the drum is successively wiped by the towel means.

In FIG. 1, it should be understood that many of the towel means are not shown in order to avoid obscuring other portions of the drawings. It should be understood, however, that the towel means would be secured at the spaced circumferential points over 360° of the drum. Thus, in the preferred embodiment, there may be as many as 16 individual towel means individually depending from the drum.

As indicated by the arrow 19 in FIG. 1, the drum 12 is caused to rotate in a counterclockwise direction when viewing a car passing from right to left along the path indicated by the arrow 11.

In accord with a feature of this invention, there is provided a switch means schematically indicated at 20 on a side of the frame 10 for engagement and operation by a car passing under the drum. This switch means 20 is interconnected with the motor 13 as indicated by the dashed line 21. The arrangement is such that actuation of the switch means by a car passing under a drum will de-energize the motor means 13 so that the drum does not rotate while the car is passing thereunder. However, after a car has completely passed under the drum, the switch means 20 will be released to energize the motor 13 and permit the drum to rotate and thereby successively position new towels for a next arriving car.

Still referring to FIG. 1, in accord with a still further important feature of this invention, there is provided in combination with the drum a heating means 22 in the form of an iron press defining an arcuate chamber having a concave exterior surface extending along the path of the drum in juxtaposed relationship to an upper convex cylindrical surface portion of the drum periphery. This iron press is pivotally mounted to the frame 10 independently of the drum 12 as indicated by the pivot rod 23. A gas tube the entrance portion of which is shown at 24 passes through the interior arcuate chamber of the iron press 22 and is arranged to receive gas along a line indicated by the dashes 25 from a gas source 26. Further details of this heating means will be described subsequently with respect to FIG. 2.

Still referring to FIG. 1, the plurality of towel means 15 are all substantially identical and thus a detailed description of one will suffice for all. Thus, with respect to the first towel means 15 shown in full view, the structure includes a large rectangular fabric material defining a curtain 27. The upper end of this curtain is supported by a transverse rod 28 extending parallel to the axis A—A of the drum adjacent to the cylindrical surface thereof and coupled to opposite end portions of the drum by coupling links such as indicated at 29 and 30, in such a manner that the curtain depends or hangs from the drum. A plurality of individual towels 31 in turn are individually removably fastened to the lower end of the curtain 27 as indicated at 32 and depend therefrom. The arrangement is such that should any one of the individual towels 31 become snagged, it can be pulled free of the lower end of the curtain without interference with the remaining towels.

In the specific embodiment illustrated in FIG. 1, each of the curtains such as the curtain 27 include slits such as indicated at 33 extending upwardly from between certain ones of the towel 31 to permit the curtain to separate at the slits and thus facilitate passage of vertical projections of the car passing thereunder. Such vertical projections, for example, might include the automobile antenna.

Figure 2:
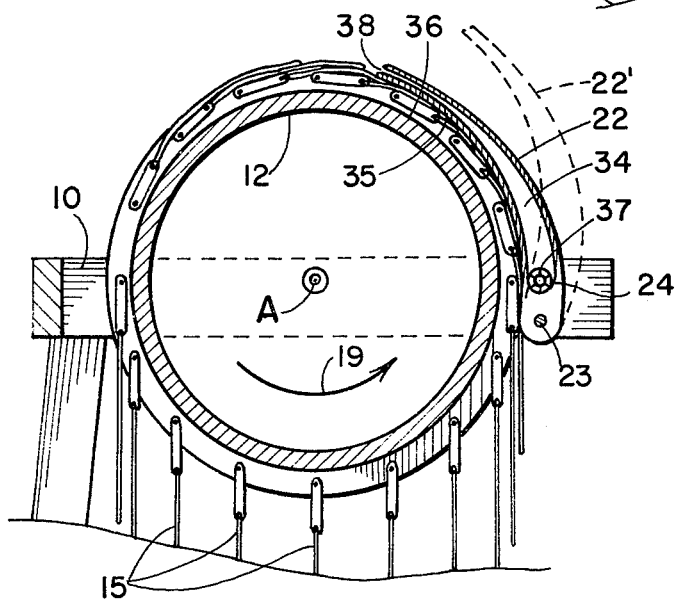
FIG. 2 is a fragmentary cross section taken in the direction of the arrows 2—2 of FIG. 1.

Referring now to FIG. 2, further details of the structure shown in FIG. 1 will be described. Considering first the iron press heater 22, the arcuate chamber defined thereby is indicated at 34. The underside of the iron press heater 22 defines an exterior concave surface 35 juxtaposed an upper convex cylindrical surface portion 36 of the drum 12. The arrangement is such that a towel means passes between the opposed concave and convex surfaces 35 and 36 as the drum 12 is caused to rotate. The gas tube 24 as shown in FIG. 2 extending along the length of the arcuate chamber 34 includes lateral openings 37 so that gas passed thereinto will burn in the arcuate chamber and thereby heat the concave exterior surface 35. The extreme upper end of the arcuate chamber 34 includes an exhaust opening 38.

As described with respect to FIG. 1, the drum is ordinarily not rotated while a car is passing thereunder. However, after the car has completely passed under the drum, the switch means 20 is released to energize the motor 13 and cause the drum to rotate perphaps three-fourths of a turn between the successive cars. In this rotation in the direction of the arrow 19 as also indicated in FIG. 2, the various curtains and towels will be passed under the iron press or heater 22. Because of the pivoting of the heater about the pivot rod 23, it can swing outwardly or inwardly towards the peripheral cylindrical surface of the drum 12 as indicated by the dashed lines 22'. As a consequence, the concave exterior surface 35 can be brought into pressing engagement with the upper convex cylindrical surface 36 to provide a squeezing force on the towel means simultaneously with the applying of heat to the same, as they successively pass under the iron press. This arrangement assures that substantially most of the moisture accumulated by the towels is removed before they flop over to the other side of the drum preparatory to intercepting a next vehicle.

Figure 3:
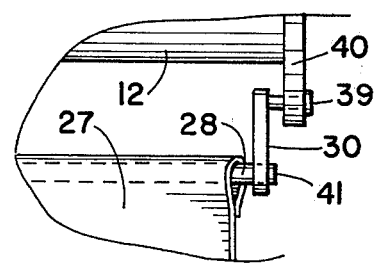
FIG. 3 is a fragmentary perspective of a portion of the apparatus looking in the direction of the arrows 3—3 of FIG. 1; and, FIG. 4 is a fragmentary cross section of the lower end portion of one of the depending towel means looking in the direction of the arrows 4—4 of FIG. 1.

Referring to FIG. 3, details of one means for coupling the curtain supporting rod 28 to the drum are shown. Thus, the coupling link 30 may be pivoted as at 39 to a rim or flange portion 40 of the drum 12. The lower end of the link 30 may similarly be pivoted to the rod 28 as at 41. This arrangement provides for free swinging movement of the individual curtains and assures proper depending support for the upper portions of the curtains. In this respect, the upper end of each of the curtains such as 27 and as shown in FIG. 3, can be wrapped around the transverse rod 28 and permanently sewn or otherwise secured so that it will be retained by the transverse rod.

Figure 4:
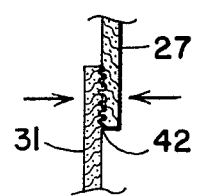

FIG. 4 shows a desired and preferred fastening means for the individual towels to the lower ends of the curtains. Thus, there is shown one of the towels 31 secured to the lower end of the curtain 27 as by a pressure responsive friction means 42. Such a fastening will permit the towel to be readily removed if sufficient pulling force is exerted thereon. Otherwise, the towel is frictionally anchored to the lower end of the curtain. An example of such a friction fastening arrangement takes the form of small fabric hooks and loops which frictionally interlock when pressed together. Such material is presently manufactured under the trade name VELCRO.

OPERATION

The operation of the car dryer will be evident from the foregoing description. Preferably, the dryer itself would be used in conjunction with the usual type of blower means except that not nearly as much air need be blown when the dryer is used. In this respect, the air blowers can be operated at approximately one-third to one-fourth the normal horsepower required. Thus, as automobiles pass through the car wash system, conventional type blowers would first be applied to the vehicle to blow off the main stream of water and thereafter the vehicle would pass through the car dryer shown in FIG. 1.

As stated, when each individual car engages the switch means 20, the cylindrical drum 12 is stopped from its rotational movement so that the car will simply pass under the successive towel means 15. When the car has completely passed under the towel means, the switch 20 is released permitting rotation of the drum between the successive cars.

The foregoing rotation will bring the successively engaged towels which have picked up moisture between the upper cylindrical surface of the drum and the iron press heater 22 wherein pressure and heat will be applied to remove a substantial amount of the picked up moisture in the towels. Continued rotation of the drum will cause the towels to simply flop over the other side of the cylindrical drum 12 as described in conjunction with FIG. 2 so that as a successive car passes under the drum, substantially dry towels will be successively engaged.

Should any one or more of the individual towels on the bottom of the curtains become snagged, they will simply be pulled free without interfering with the remaining towels so that the chances of any jamming or hang-up during the operation of the equipment are minimized.

As a consequence of utilizing a single large diameter drum for supporting the plurality of towel means wherein there is provided an efficient drying means in conjunction therewith, a minimum amount of additional space is required in an automatic car wash facility.

From the foregoing description, it will thus be evident that the present invention has provided an improved mechanized car dryer for use with automatic car wash systems.

What is claimed is:

1. A car dryer for use in automatic car wash systems, including, in combination:
   a. frame means positioned over the path of travel of a car through the car wash system;
   b. a cylindrical horizontal drum rotatably mounted to the frame means above the path so that a car may pass under the drum, the axis of the drum extending transversely to the path of the car and the drum having an axial length at least equal to the width of the car;
   c. motor means coupled to the drum for rotating it when energized; and,
   d. a plurality of towel means coupled to the device and depending from its peripheral surface at circumferentially spaced points, each of said towel means including a large rectangular fabric material defining a curtain; a transverse rod extending parallel to the axis of the drum adjacent to the cylindrical surface thereof and coupled to opposite end portions of the drum at corresponding circumferential points, said rod supporting the upper end of said curtain; and towels individually removably fastened to the lower end of said curtain and depending therefrom whereby a car passing under the drum is successively wiped by the towel means, rotation of the drum positioning successive towel means for wiping action, and whereby should any one or more of said towels become snagged when a car is being wiped thereby, it is pulled free from said curtain without interference with the remaining towels.

2. A car dryer according to claim 1, including switch means connected to said motor means and positioned to be actuated by a car passing under the drum for de-energizing the motor means so that the drum does not rotate while the car is passing thereunder.

3. A car dryer according to claim 1, including heating means coupled to said frame means in a position to apply heat to the towel means as they successively pass over the top cylindrical portion of the drum as a result of rotation of the drum.

4. A car dryer for use in automatic car wash systems, including, in combination:
   a. frame means positioned over the path of travel of a car through the car wash system;
   b. a cylindrical horizontal drum rotatably mounted to the frame means of the path so that a car may pass under the drum, the axis of the drum extending transversely to the path of the car and the drum having an axial length at least equal to the width of the car;
   c. motor means coupled to the drum for rotating it when energized;
   d. a plurality of towel means coupled to the device and depending from its peripheral surface at circumferentially spaced points so that a car passing under the drum is successively wiped by the towel means, rotation of the drum positioning successive towel means for wiping action; and,
   e. heating means coupled to said frame means in a position to apply heat to the towel means as they successively pass over the top cylindrical portion of the drum as a result of rotation of the drum, said heating means comprising an iron press shaped to define an arcuate chamber having a concave exterior surface extending along the length of the drum in juxtaposed relationship to an upper convex cylindrical surface portion of the drum periphery, said towel means passing between said concave exterior surface and convex cylindrical surface; a gas tube having lateral openings passing through the interior of the chamber such that burning of gas passing out the lateral openings heats said concave exterior surface; and means pivoting the iron press to said frame means for swinging movement about an horizontal axis spaced from and parallel to the drum axis whereby said concave exterior surface can be brought into pressing engagement with said upper convex cylindrical surface to provide a squeezing force on the towel means simultaneously with the applying of heat to the same as they successively pass under said iron press.

5. A car dryer according to claim 1, in which said towels are fastened to the lower ends of said curtain by pressure responsive friction means actuated by pressing marginal overlapping portions of the towel and curtain together.

6. A car dryer according to claim 1, in which said curtain includes slits extending upwardly from between certain ones of said towels to facilitate passage of vertical projections of a car passing thereunder.

7. In a car wash dryer:
   a. frame means positioned over the path of travel of a car through a car wash system;
   b. endless carrier means rotatably mounted on the frame means so that a car may pass under the carrier means;
   c. motor means coupled to the carrier means for advancing it when energized;
   d. a plurality of towel means coupled to the carrier means and depending therefrom at spaced points so that a car passing under the carrier means is successively wiped by the towel means, advancement of the carrier means positioning successive towel means for wiping action; and, e. heating means coupled to said frame means in a position to apply heat to the towel means, said heating means comprising an iron press shaped to define an arcuate chamber having a concave exterior surface extending across the width of the carrier means in juxtaposed relationship to an upper convex cylindrical surface portion, said towel means passing between said concave exterior surface and convex cylindrical surface; a gas tube having lateral openings passing through the interior of the chamber such that burning of gas passing out the lateral openings heats said concave exterior surface; and means pivoting the iron press to said frame means for swinging movement about an horizontal axis whereby said concave exterior surface can be brought into pressing engagement with said upper convex cylindrical surface to provide a squeezing force on the towel means simultaneously with the applying of heat to the same as they successively pass under said iron press.

8. In a car wash dryer:

a. frame means positioned over the path of travel of a car;

b. endless carrier means mounted on the frame means;

c. a plurality of curtain means secured to the carrier means at spaced points therealong;

d. a plurality of towels; and e. a plurality of releasable connecting means securing the towels individually to the free ends of the curtain means whereby any towel snagged by a car is pulled loose from the curtain means without interference with the remaining towels.

* * * * *